United States Patent [19]

Sideman

[11] 3,952,131

[45] Apr. 20, 1976

[54] HEAT TRANSFER PRINT SHEET AND PRINTED PRODUCT

[76] Inventor: Carl E. Sideman, 30 Carriage Way Drive, Fitchburg, Mass. 01420

[22] Filed: May 14, 1974

[21] Appl. No.: 469,914

Related U.S. Application Data

[63] Continuation-in-part of Ser. No. 377,948, July 10, 1973, abandoned.

[52] U.S. Cl.................................... 428/334; 8/2.5 A; 101/470; 101/473; 156/230; 156/240; 156/277; 156/289; 428/335; 428/336; 428/451; 428/500; 428/507; 428/913; 428/914
[51] Int. Cl.².................. B32B 13/12; B32B 27/06; D06P 1/76
[58] Field of Search............... 161/165, 406 T, 406, 161/413, 249, 216, 208; 117/3.2, 1.5, 38, 76 P; 8/2.5; 156/230, 277, 240, 289; 428/914, 913, 332, 334, 461, 451, 507, 335, 336, 500; 101/470, 473

[56] References Cited
UNITED STATES PATENTS

| 2,721,821 | 10/1955 | Hoover | 117/3.2 |
|---|---|---|---|
| 2,920,009 | 1/1960 | Humphner | 161/406 T |
| 3,359,127 | 12/1967 | Meyer | 161/406 X |
| 3,403,045 | 9/1968 | Erickson | 161/250 |
| 3,574,049 | 4/1971 | Sander | 156/230 |
| 3,647,503 | 3/1972 | Mizutani | 117/38 |
| 3,860,388 | 1/1975 | Haigh | 161/216 |
| R27,892 | 1/1974 | Blake | 101/473 |

*Primary Examiner*—George F. Lesmes
*Assistant Examiner*—Ellis P. Robinson

[57] ABSTRACT

A heat transfer print sheet comprising a base sheet, printing on said base sheet, a coating overlying the printed surface of the base sheet, said printing being capable of transferring through said coating upon application of heat and pressure, said coating preventing the heat transfer print sheet from adhering to a substrate to which the printing is transferred, said transferred printing permeating into the interior of said substrate to provide a wear resistant print thereon, said printing being transparent to light and thereby enhanced in color by any background color on said substrate.

1 Claim, 6 Drawing Figures

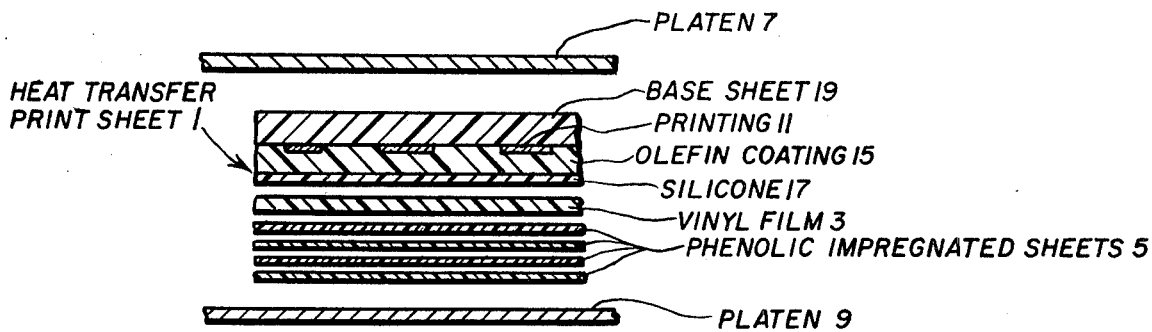
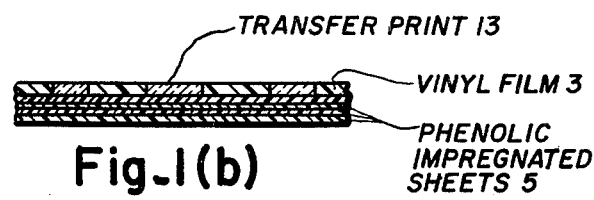
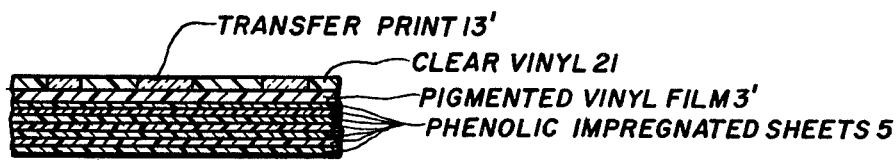
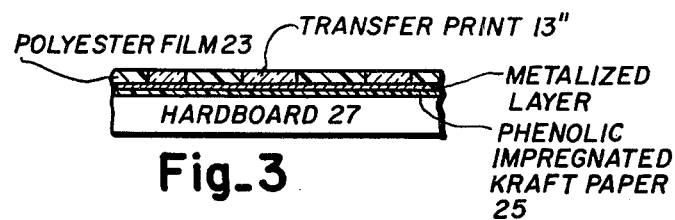
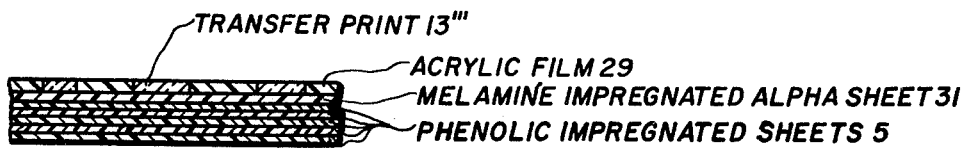
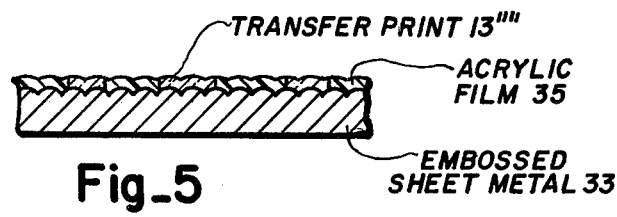

HEAT TRANSFER PRINT SHEET AND PRINTED PRODUCT

CROSS REFERENCE TO RELATED APPLICATION

This is a continuation-in-part of application of Ser. No. 377,948 filed July 10, 1973 now abandoned.

BACKGROUND OF THE INVENTION

Printing using a sublimable coloring agent has been known and used for a number of years. This process is known as heat transfer printing and is described in U.S. Pat. No. 3,363,557 entitled "Heat Transfer of Indicia Containing Sublimable Coloring Agent", which issued on Jan. 16, 1968. The patent describes the use of sublimable dye stuffs contained in a resinous binder on a paper transfer sheet. When the sheet is pressed against a textile fabric and when sufficient heat is applied, the sublimable dye is vaporized and permeates into the textile. The technique has found its chief use in printing knitted polyester which is in part due to the stretchy nature of knitted fabrics which prevents use of conventional printing techniques. In addition, polyesters have great affinity for these type of dyes.

Other than fabric printing, no one has extended this heat transfer printing technique on a commercial basis to other decorative printing markets. A particularly interesting application would be the printing of polymeric films or polymeric coated substrates which are used, for example, in horizontal and vertical decorative surfacing. What makes the heat transferring printing technique inviting in this area is that these films and coated substrates are generally laminated under heat and pressure to a supporting substrate. Heat transfer printing could take place simultaneously with the lamination step thereby eliminating the need for a separate film printing step.

The problem encountered in bringing this to a commercial state is that the high pressure and temperature conditions of lamination cause the film or coated substrate to adhere to the heat transfer print sheet preventing the removal of the heat transfer sheet after the print has been transferred.

BRIEF DESCRIPTION OF THE PRESENT INVENTION

The present invention has overcome the foregoing problem by overcoating the heat transfer sheet with a coating which allows the sheet to be separated from the film or coated substrate despite the high pressure and temperature conditions that are applied during lamination.

A film or coated substrate printed in accordance with the present invention has enhanced wear resistance and an unexpected decorative effect. The dye permeates into the film or coating and therefore the print resists surface abrasion. The dye transfers free of ink binder resulting in a brilliant print and one that is transparent and capable of being enhanced by a colored or metallic background.

A heat transfer print sheet constructed in accordance with the present invention, is formed in accord with conventional practice, by printing or coating a sublimable dye containing ink on a base sheet. The printed sheet is then overcoated.

While the material for the overcoating is chosen to impart release properties to the heat transfer print sheet, it is also essential that the coating not interfere with the passage of dye therethrough. In order to accomplish this, it has been found essential to use an olefin polymer coating material and to limit the coating thickness of less than 5 mils. While some transfer will take place through coating greater than 5 mils, the quality of transfer would be so poor so as to render the same unsuitable for commercial use. However, as hereinafter described, under certain conditions, greater thickness may be employed.

A heat transfer print sheet, constructed as hereinabove described, can be placed, print side down, on top of a film or coated substrate just prior to lamination to ite supporting substrate in a conventional high or low pressure laminating press. When heat and pressure are applied to consolidate the laminate, the print transfer to the film or coated substrate. After consolidation, the heat transfers to the film or coated substrate. After consolidation, the heat transfer print readily strips off leaving the film or coated substrate with the print permeated therein providing a brilliant wear resistant print.

THE DRAWINGS

FIG. 1(a) is an exploded view of a vinyl film which is adapted to be laminated to a supporting substrate with a heat transfer print sheet, constructed in accordance with the present invention, shown superimposed over the assembly prior to lamination.

FIG. 1(b) shows the vinyl film of FIG. 1 printed and adhesively secured to its substrate after consolidation under heat and pressure with the heat transfer print sheet of the present invention stripped away.

FIGS. 2–5 show various other film or coated substrates which can be printed during lamination using a heat transfer print sheet in accordance with the present invention.

DETAILED DESCRIPTION OF THE DISCLOSURE

Referring to FIG. 1(a), a schematic exploded view is shown which illustrates the use of a heat transfer print sheet 1 constructed in accordance with the present invention placed print face down on a pigmented vinyl film 3 which is adapted to be adhered to a supporting substrate formed from a plurality of phenolic resin impregnated sheets 5.

As shown, the assembly is placed between platens 7 and 9 of a conventional laminating press. Through platens 7 and 9, heat and pressure is applied so as to fuse the vinyl film 3 and sheets of substrate 5. Generally, pressure of 1000 lbs./in$^2$ at 300°F for 15 minutes is sufficient to consolidate the vinyl film 3 and substrate 5.

As hereinafter more particularly described, simultaneously with this consolidation, the print 11 on heat transfer print sheet 1 transfers and permeates into the vinyl film 3. After consolidation, the heat transfer print sheet 1 is readily stripped away leaving a printed finished product as illustrated in FIG. 1(b). While a layer 11 is referred to as print it is to be understood that layer 11 can be formed by printing or coating and that it can be continuous or discontinuous.

The final print on the film 3 is extremely wear resistant because the dye permeates into the film 3. Only the dye of the printing 11 sublimes and thus the printing 13 in film 3 is free of binder. This makes for an exceptionally brilliant print.

Referring again to FIG. 1a, the heat transfer print sheet 1 constructed in accordance with the present invention comprises a base sheet 19 which may be a conventional printing grade of paper coated to impart hold out for the printing ink. Aluminum foil or suitable plastic could also be used.

Base sheet 19 is printed or coated on using any conventional printing or coating method such as reverse roll, trailing blade, gravure, offset, silk screen, flexographic, etc. The heat transfer inks employed are commercially available and may be for example of the type described in British Specification No. 1189026 published Apr. 21, 1970 or U.S. Pat. No. 3,363,557 which issued on Jan. 16, 1968. Generally, these inks include conventional resin binders and dye stuffs which are described as disperse dyes as set forth in the color index published in 1956 by the Society of Dyers and Colorers in Bradford, England.

As hereinbefore described, the dye stuffs should be capable of subliming under the heat and pressure conditions of conventional laminating presses. Generally, the commercially available dye stuffs used in heat transfer printing or polyester textiles have the ability to sublime when subjected to a temperature of between 140°F to 500°F for 10 to 20 seconds. Accordingly, most of the commercially available dye stuffs presently used as heat transfer dyes are usable in the present invention because the dwell time, pressure and temperature applied during conventional laminating exceed the conditions required for these dyes to sublime.

Since it would be undesirable for the dye stuffs to resublime from the substrate to which they have been transferred, it generally is preferred that the dispersed dyes used have a sublimation temperature above 200°F. The only limitation on the upper temperature limit for sublimation would be the laminating temperature used in carrying out the transfer. This will vary and depend on the temperature and pressures required to consolidate the laminate. Generally, these temperatures do not exceed 1000°F.

A polyolefin coating 15 is extruded over the printing 11 of the heat transfer print sheet 1. The coating 15 is extruded because conventional solvent coatings would attack the printing 11. Hot melt techniques could also be used or aqueous emulsion type coating could be employed and coated by conventional wire rod, reverse roll, air knife, gravure, trailing blade, etc. As an alternative, a self sustaining polyolefin film may be laminated over printing 11 in place of coating 15.

Coating 15 serves two purposes. Firstly, it prevents the heat transfer print sheet 1 from sticking to the film material 3, as would otherwise occur under the heat and pressure conditions of conventional laminating. Secondly, while performing the first function, it allows the dye in printing 11 to pass therethrough.

In order to accomplish the foregoing, it has been found essential that coating 15 be formed of an polyolefin such as polyethylene, polypropylene, polybutylene or copolymers thereof. These polymers and copolymers have the inherent release properties required and are distinguished in that they allow the disperse dyes hereinbefore described to pass therethrough.

The theory behind the ability of olefin polymers to allow the dyes to pass therethrough is not fully understood. Other polymeric coatings will not allow passage. If a cellulose coating such as cellophane is used for coating 15, the dye would be completely repelled. If a polyester coating is used for coating 15, the dye would be fully absorbed by the polyester.

In view of the foregoing, it is felt that solubility has some bearing on this phenomena and that sublimable dyes are soluble in the olefin polymers to an extent so as to allow passage therethrough but not absorption therein when the dye sublimes.

Both high and low density polyethylene have been successfully employed for coating 15 and density does not appear critical. However, the thickness of the coating is important and should be kept below 5 mils and preferably in a range of ½ to 2 mils to assure good transfer. While the quality of the transfer deteriorates when coating 15 is greater than 5 mils, this can be compensated for by high heat and pressure and longer dwell time and depending on these conditions, coating thickness of up to 15 mils may be employed.

As an alternative to coating 15, a self supporting film of a polyolefin may be placeed on top of the print 11. Such a film should also have a thickness between ½ to 2 mils. Since this thickness range presents handling problems, the use of a self supporting film is not a preferred method. Thicker films, up to 15 mils, may be employed if compensated for by high heat and pressure and longer dwell time.

It is to be understood that by using a self supporting film, base sheet 19 can be omitted and the film itself coated or printed with a colored sublimable material. In this instance, the uncolored surface of the film would be placed in contact with the substrate to be printed.

A still further available alternative would be to directly incorporate the colored sublimable material internally into the film during film fabrication. In this instance, the film acts as the vehicle for the sublimable dye.

A silicone coating 17 is shown overcoated on coating 15. This coating is not essential but does function to enhance release. This coating is applied in a film thickness which is practically monomolecular and so it does not interfere with dye passage. The silicone can be applied using any conventional method such as gravure, reverse roll, trailing blade, air knife, etc.

For specifics as to formulating polyethylene and subsequent silicone coating, reference is made to U.S. Pat. No. 3,403,045 wherein these same type coatings are used as release coatings for pressure sensitive tapes.

Referring to FIG. 2, a finished product similar to that of FIG. 1(a) is shown except that a clear vinyl film has been placed on top of the vinyl film 3 shown in FIG. 1(a). The laminate is formed in a manner identical to that shown in FIG. 1(a) with the addition of the clear vinyl film 21 above the pigmented vinyl film 3'. In this instance, the print transfers to the clear vinyl and the pigmented vinyl provides background color. The transferred print 13' is comprised of colored dye free of binder. Accordingly, print 13' is transparent. The background color of the pigmented vinyl film 3' transmits through the dye and therefore enhances the colored effect.

Referring to FIG. 3, another finished laminate is shown comprising a metalized polyester film 23 laminated by means of a phenolic impregnated kraft sheet 25 to a base sheet 29 comprising particle board, plywood, hardboard or the like. Only the phenolic impregnated kraft sheet 25 has to be cured so the entire assembly can be consolidated in about 5 minutes at 200 lbs./in$^2$ at 145°F. As in FIG. 1(a), a heat transfer print sheet 1, constructed in accordance with the present invention, is inserted face down, on top of the polyester film 23 prior to consolidation. After consolidation, the heat transfer print sheet is stripped away leaving a transferred print 13'' permeated into film 23. In this instance, print 13'' takes on a metallic effect due to the metalized background.

It is to be understood that the metalized film shown in FIG. 3 could be consolidated to other than hardboard 27. For example, the metalized film 23 could be substituted for vinyl film 3 in FIG. 1(a) and consolidated under the same pressure, temperature and dwell time conditions to consolidate the same to a plurality of phenolic impregnated sheet.

In FIG. 4, an assembly similar to that described in FIG. 1(b) is shown except that an unpigmented transparent acrylic film 29 replaces vinyl film 3 and a melamine impregnated alpha cellulose sheet 31 is inserted between the acrylic film 29 and the phenolic impregnated sheets. The reason for inserting the alpha sheet is that the alpha sheet can be pigmented so as to provide a good background color to the print subsequently formed on the transparent film 29. Without the pigmented alpha sheet, the dark brown phenolic impregnated sheets 5 would detract from the print. The assembly can be consolidated in a manner identical to the consolidation in FIG. 1(a).

The problem of applying acrylic to a phenolic base also applies to polyvinyl fluoride and other films, and accordingly structure similar to FIG. 4 would be used in other film applications so as to avoid a dark colored background to the print.

Referring to FIG. 5, a further embodiment of the invention is illustrated wherein an embosssed sheet of metal 33 is coated with an acrylic film 35. A particular feature here is that the metal as shown is embossed and the acrylic coating follows this embossment. Using a heat transfer print sheet member as herein described, a print 13'''' readily transfers even into the embossed areas. No other method known could be used to obtain this effect or print into the embossed areas.

It is to be understood that other than an acrylic coating 33 could be employed on sheet metal 33. Suitable for this purpose would be polyesters, vinyl, melamine, or any other polymeric material receptive to heat transfer dyeing. It is to be further understood, that the sheet material 33 showing in FIG. 5 need not be embossed but may have a planer surface.

The foregoing has described assemblies wherein a film or coated substrate is laminated to a supporting substrate. It is to be understood that the transfer could take place without a supporting substrate directly to a film or coated substrate.

It is to be understood further that the invention may have particular advantage in transferring a print to rigid pigmented polymeric substrates. In this case, shorter dwell time can be employed thereby limiting penetration of the dye and preventing the pigment in the substrate from convering the transferred dye. Shorter dwell time will also allow textured rigid sheets to retain their texture particularly if the polymer has a high melt viscosity as is the case with rigid plastics such as Kydex (an acrylic polyvinyl chloride alloy) sold by Rohm and Hass Company of Independence Mall West, Philadelphia, Pennsylvania. The invention is illustrated in the following Examples:

EXAMPLE I

A roll of a printing grade of paper was gravure printed with a floral decorative design using a commercially available heat sublimable ink which begins to sublime at a temperature of about 100°C. A polyethylene coating was then extruded onto the printed surface to a thicknes of between ½ and 1 mil. The polyethylene was then overcoated with silicone using a 10% methyl silicone water emulsion applied by a roll coater. The heat transfer print sheet so produced was placed print face down in contact with the coated surface of an embossed steel plate. The coating on the plate comprised a pigmented acrylic thermo setting coating. The assembly was placed between two platens in a conventional laminating press and subjected to temperature of 140°C at 400 lbs./in$^2$ for a period of 2 minutes. After this, the heat transfer print sheet was stripped away and a brilliant floral print was embedded in the acrylic coating.

EXAMPLE II

A heat transfer print sheet was prepared as in Example I but in this instance the heat transfer print sheet was placed print face down over a ½ mil thick polyester film which had a vacuum metalized coating on its reverse side. A phenolic impregnated kraft sheet of paper was placed in contact with the metalized layer and particle board was placed beneath the impregnated sheet. This assembly was then subjected to 200 lbs./in$^2$ for five minutes at 145°C in a conventional laminating press. The assembly consolidated and the heat transfer print sheet was stripped away leaving a print on the polyester film which took on a metallic appearance.

EXAMPLE III

A pigmented vinyl film was placed over six sheets of phenolic impregnated kraft paper. A clear vinyl film was placed over the pigmented film. A heat transfer print sheet prepared as in Example I was placed print face down over the clear vinyl and the entire assembly was subjected to 1000 lbs./in$^2$ for 15 minutes at 145°C. The phenolic cured and the vinyl films fused forming a permanent bond between the kraft and the vinyl films. The print sheet was stripped away. The print fully transferred to the clear vinyl layer and the pigmented vinyl film provided an enhanced background.

EXAMPLE IV

An alpha cellulose pigmented sheet of paper was impregnated with a melamine formaldehyde resin and placed over six sheets of phenolic impregnated kraft paper. Any acrylic film was placed over the alpha paper and a heat transfer print sheet prepared as in Example I was placed over the acrylic film. The assembly was subjected to 1000 lbs./in$^2$ for 15 minutes at 145°C causing the assembly to fuse except that the print was capable of readily stripping away. The print fully transferred to the acrylic film.

EXAMPLES V–VIII

Examples I–IV were repeated except that in this instance polypropylene was substituted for the polyethylene coating on the heat transfer print sheet. The results were identical except that the transferred print was not quite as brilliant as in the previous examples.

EXAMPLES IX–XII

Examples I–IV were repeated except that in this instance polybutylene was substituted for the polyethylene coating on the heat transfer print sheet. The results were identical except that the transferred print was not quite as brilliant as in the previous examples

EXAMPLE XIII

A heat transfer print sheet was prepared as in Example I but in this instance the heat transfer print sheet was placed print face down on one 60-mil thick pigmented sheet of Kydex (an acrylic polyvinyl chloride alloy) sold by Rohm and Hass Company of Philadelphia, Pennsylvania. The assembly was placed face down in a laminating press for 30 seconds at 300°F under 50 lbs./in$^2$. The print sheet was separated, a brilliant print was transferred. The shorter dwell time in this example prevented excessive penetration of the dye into the sheet thereby preventing the pigment from covering the dye to any substantial extent.

EXAMPLES XIV–XVI

Example I was repeated except that a high density polyethylene coating was used on the heat transfer print sheet. The results were identical to those obtained in Example I–IV.

It is to be understood that the foregoing description and examples may be varied within the scope of the invention by variations within the skill of the art.

What is claimed is:

1. A heat transfer print sheet comprising:
  a. a base sheet,
  b. printing on said base sheet,
  c. said printing including sublimable dyes capable of subliming at an elevated temperature in a range between 200° and 1000°F.,
  d. a polyolefin coating of less than 5 mils on the printed surface of said base sheet, and
  e. an essentially monomolecular silicone release coating on said olefin coating.

* * * * *